(12) United States Patent
Hirano (10) Patent No.: US 7,804,813 B2
(45) Date of Patent: Sep. 28, 2010

(54) RADIO COMMUNICATION METHOD, RADIO COMMUNICATION TERMINAL AND RADIO LAN SYSTEM

(75) Inventor: Jun Hirano, Yokosuka (JP)

(73) Assignee: Panasonic Corporation, Osaka (JP)

( * ) Notice: Subject to any disclaimer, the term of this patent is extended or adjusted under 35 U.S.C. 154(b) by 1058 days.

(21) Appl. No.: 10/520,512

(22) PCT Filed: Jul. 4, 2003

(86) PCT No.: PCT/JP03/08522

§ 371 (c)(1),
(2), (4) Date: May 11, 2005

(87) PCT Pub. No.: WO2004/006508

PCT Pub. Date: Jan. 15, 2004

(65) Prior Publication Data

US 2005/0201314 A1  Sep. 15, 2005

(30) Foreign Application Priority Data

Jul. 8, 2002  (JP)  ............................. 2002-199227

(51) Int. Cl.
*H04B 7/212* (2006.01)
(52) U.S. Cl. ........................ 370/347; 455/411; 455/428; 370/389; 370/390; 370/393
(58) Field of Classification Search .................. 370/349, 370/347, 477, 344, 336, 377, 330, 389–393
See application file for complete search history.

(56) References Cited

U.S. PATENT DOCUMENTS 6,212,166 B1  4/2001  Akiyama (Continued)

FOREIGN PATENT DOCUMENTS

EP  0893905  1/1999

(Continued)

OTHER PUBLICATIONS

International Search Report dated Oct. 21, 2003.

(Continued)

*Primary Examiner*—Lester Kincaid
*Assistant Examiner*—Sayed T Zewari
(74) *Attorney, Agent, or Firm*—Dickinson Wright PLLC (57) ABSTRACT

The present invention discloses a radio communication method or the like, which contributes to the improvement of data transmission efficiency in a radio communication based on TDMA system (in particular, radio communication in accordance with IEEE Std. 802.11) by providing idle time between the data transmitted and received by radio communication terminals on a radio section. In the radio communication between radio communication terminals, data transmission efficiency is improved by reducing transmission time of header added to the data or by reducing idle time. More concretely, header is added to the data for each predetermined data transmission, for instance, and by transmitting the other data without header added to it, transmission time of header is reduced. Also, data transmission efficiency is improved by carrying out methods such as a method to acquire header of the data on radio section in advance, a method to utilize identification information as the header, and a method to transmit continuous data by reducing IFS (InterFrame Space) after Ack (receiving acknowledgment information).

24 Claims, 10 Drawing Sheets

U.S. PATENT DOCUMENTS

| | | |
|---|---|---|
| 6,680,929 B1 | 1/2004 | Iida |
| 6,791,996 B1 | 9/2004 | Watanabe |
| 2004/0071142 A1* | 4/2004 | Moriwaki et al. ........... 370/392 |
| 2004/0141522 A1* | 7/2004 | Texerman et al. ........... 370/466 |

FOREIGN PATENT DOCUMENTS

| | | |
|---|---|---|
| EP | 1119153 | 7/2001 |
| JP | 11-46294 | 6/1989 |
| JP | 10-155007 | 6/1998 |
| JP | 10-215246 | 8/1998 |
| JP | 1146294 | 2/1999 |
| JP | 11046294 | 2/1999 |
| JP | 2000-253059 | 9/2000 |
| JP | 2000-261399 | 9/2000 |
| JP | 2001-160813 | 6/2001 |
| JP | 2001-237858 | 8/2001 |
| JP | 2001237858 | 8/2001 |
| JP | 2002-044099 | 2/2002 |
| JP | 2002-141931 | 5/2002 |

OTHER PUBLICATIONS

Yoshikazu Kobayashi, "Telecommunication," vol. 17, No. 12, Nov. 25, 2001, pp. 126-127.

ASNI/IEEE Std 802.11, 1999 Edition "Information technology Telecommunications and Information exchange between systems Local and metropolitan area networks Specific requirements Part 11: Wireless LAN Medium Access Control (MAC) and Physical Layer (PHY) Specifications," pp. 1-511.

IEEE Std 802.11e/D3.0 May 2002 (Draft Supplemental to IEEE Std 802.11, 1999 Edition) "Draft Supplement to Standard for Telecommunications and Information Exchange Between Systems LAN/MAN Specific Requirements Part 11: Wireless Medium Access Control (MAC) and physical layer (PHY) specifications: Medium Access Control (MAC) Enchancements for Quality of Service (QoS)," pp. 1-145.

"QoS Approach Based on DCF In Wireless Local Area Network" with English Translation, Jun. 2002, pp. 1-3.

Y. Kobayashi, "Complete Explanation: IP Introductory Course."RIC Telecom Co., Ltd., Telecommunication, Nov. 25, 2000, vol. 17, No. 12, pp. 126-127, 9 pages total. With partial English translation.

* cited by examiner

RADIO COMMUNICATION METHOD, RADIO COMMUNICATION TERMINAL AND RADIO LAN SYSTEM

TECHNICAL FIELD

The present invention relates to a radio communication method, a radio communication terminal, and a radio (wireless) LAN system. In particular, the invention relates to a radio communication method, a radio communication terminal, and a radio LAN system, which have functions to avoid collision of signals between terminals belonging to a radio LAN system.

BACKGROUND ART

Currently, the standardization of the standards of radio LAN (Local Area Network) is being prepared by IEEE (Institute of Electrical and Electronics Engineering). The standards of the radio LAN is defined as IEEE Std 802.11 (hereinafter referred as "IEEE 802.11"). At present, extension standards such as IEEE 802.11e are under consideration in order to carry out the extension relating to QoS (Quality of Service).

In IEEE 802.11, a method based on CSMA/CA (Career Sense Multiple Access with Collision Avoidance) is used as a method for media access control to avoid competition of radio (wireless) resources between two or more terminals. This CSMA/CA system is a communication system, which makes it possible to avoid collision of transmission data such as back-off by detecting carrier wave (carrier sense) transmitted from other terminal in a radio section when terminals transmit the data in addition to the detection as to whether there is idle space in the channel or not. As CSMA/CA system, communication systems called DCF (Distributed Coordination Function) and PCF (Point Coordination Function) are defined. General outline of DCF and PCF are as described below:

In DCF, idle or free time in the radio section is measured (carrier sense). When the radio section is DIFS (DCF InterFrame Space), which has no signal in a predetermined period, it is judged that signal can be transmitted. On the other hand, in case signal is present in the radio section during DIFS period, signal is transmitted after a certain period of time (idle time+back-off time) in DIFS period. In case there is no idle time in the radio section after waiting for the transmission, transmission of signal is kept under standby condition for the period of idle time.

On the other hand, PCF provides the function to operate while avoiding collision of signals with the other terminals, which occur during DCF. In case there is no signal for a certain period of time called PIFS (PCF InterFrame Space) in the radio section, PCF can be started. In this case, DIFS>PIFS, and the priority is given to the operation of PCF over the operation of DCF. Also, during PCF operation, the collision of signals between the terminals can be avoided by the communication utilizing polling system.

Regarding the communication of an acknowledgment signal Ack (receiving acknowledgment information) in data receiving or the communication during PCF, a time period called SIFS (Short InterFrame Space) is set, and the priority is given to the data communication with higher communication priority. It is designed in such manner that signals can be transmitted in case there is no signal only in SIFS period on the radio section. That is, in IFS, which acts as the standard for timing to start the transmission of signal, there are three types of IFS (i.e. DIFS, PIFS, and SIFS). Based on the relation of DIFS>SIFS, data communication with higher communication priority can transmit the signals by utilizing IFS of shorter period. As described above, according to IEEE 802.11, the time called IFS is used for media access control. Based on this IFS, it is tried to avoid collision of signals between the terminals.

In case the data is transmitted, a header is added to the data to be transmitted. This header contains essential information for transmitting and receiving of the data between the terminals, such as the information relating to parameters necessary for communication or to extension function. In some cases, header is added to control information (essential information) relating to a protocol such as control and is transmitted. Among the essential information, the information to be known by a plurality of terminals is transmitted, to make sure, by the most redundant method (standard or essential method receivable at all of the terminals).

However, in the communication based on TDMA (Time Division Multiple Access) system according to IEEE 802.11, the data communication on radio section is controlled (e.g. avoidance of collision) by performing temporal control (control of time base), e.g. by providing idle time such as IFS as described above.

When referring to a radio section according to time flow, the elapsed time in the radio section can be roughly divided to transmission time of the data to be transmitted and the other time. In the other time, idle time such as IFS and transmission time of header to be added to the data are included. In the present specification, idle time such as IFS or transmission time of header is called overhead or time required for overhead.

Figure 9:
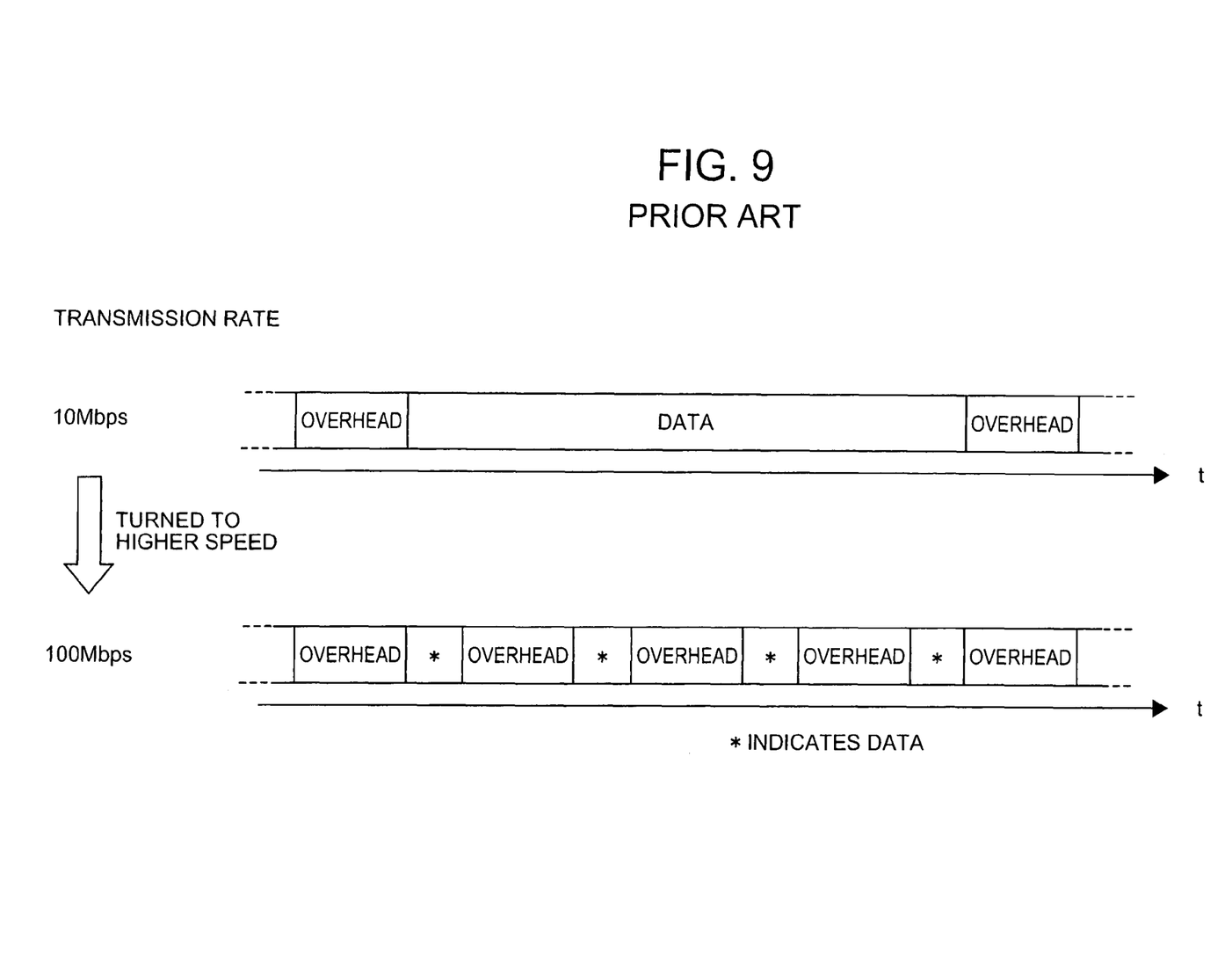
FIG. 9 is a schematical drawing to explain change of the ratio of the time required for overhead to the data transmission time in case transmission rate in the prior art is turned to higher speed.

FIG. 9 is a schematical drawing to explain the change of ratio of the time required for overhead to transmission time of data in case transmission rate is turned to higher speed in the prior art. FIG. 9 shows the case where, at the transmission rate of 10 Mbps, the ratio of the time required for overhead to the transmission time of data is 1:5. In this case, if the transmission rate is increased from 10 Mbps to 100 Mbps, data transmission time is turned to shorter (quicker), but the time required for overhead is not changed (Transmission time of header is shortened, but here, description is given by neglecting the reduction of transmission time of header). As a result, the ratio of the time required for overhead to the transmission time of data is turned to 2:1. This means that data transmission efficiency to overhead is decreased.

As described above, under the condition where media access control is performed on time basis, if high speed transmission rate is needed and data transmission rate in physical layer is increased, elapsed time other than data (time required for overhead) is relatively increased, and this leads to the decrease of substantial throughput in the data transmission. Specifically, despite of the fact that data transmission rate has been turned to higher speed, the time required for overhead (in particular, IFS) remains the same. This means that the ratio of the data transmission time to the time required for overhead is increased, and this leads to aggravation of the data transmission efficiency. Also, in association with functional extension, the control information to be added is increased. When the capacity of the data transmitted as header is increased, the time for header transmission within overhead is increased.

Figure 10:
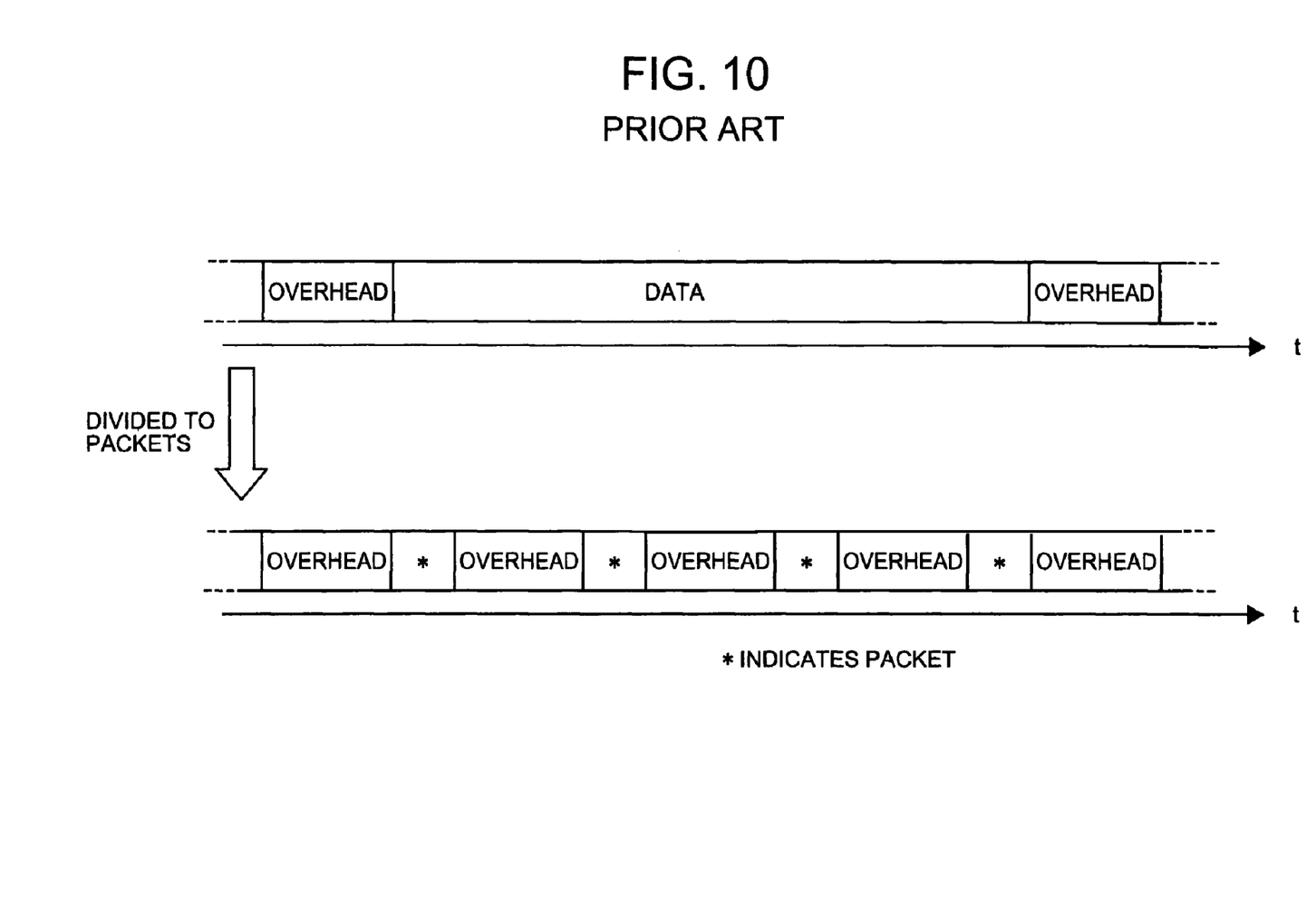
FIG. 10 is a schematical drawing to explain change of the ratio of the time required for overhead to the data transmission time in case the data in the prior art is divided.

FIG. 10 is a schematical drawing to explain the change of the ratio of the time required for overhead to the data transmission time in case data in the prior art is divided. When the data to be transmitted is divided to smaller packets for increasing the efficiency of re-transmission, occupying time (occupying ratio) of the overhead in the radio section is increased compared with the case the data is transmitted without dividing to packets. The capacity of the data transmissible within the same time period is decreased, and this means that the throughput of data transmission is decreased.

DISCLOSURE OF THE INVENTION

To solve the above problems, it is an object of the present invention to provide a radio communication method, a radio communication terminal, and a radio LAN system, by which it is possible to reduce the influence of overhead including IFS and header in radio section and to improve transmission efficiency (throughput) of the data to overhead.

To attain the above object, the present invention provides a radio communication method in a radio LAN system for radio communication based on TDMA system with idle time provided between data to be transmitted and received by radio communication terminals on a radio section, wherein said radio communication terminals carrying out radio communication perform such communication setting as to reduce transmission time of the header added to said data and/or to reduce said idle time.

By this arrangement, it is possible to reduce useless overhead and to improve data transmission efficiency.

Also, the present invention provides the radio communication method as described above, wherein for the purpose of performing communication setting to reduce the header transmission time and/or said idle time, said radio communication terminal acquires an ability to reduce transmission time of said header of said radio communication terminal, serving as communication partner, and/or to reduce said idle time.

By this arrangement, it is possible to acquire communication ability relating to overhead of the radio communication terminal of the communication partner, and this makes it possible to reduce the overhead appropriately and to provide higher efficiency.

Further, the present invention provides the radio communication method as described above, wherein said radio communication terminal acquires an ability to reduce transmission time of said header of said radio communication terminal, serving as said communication partner, and/or to reduce said idle time from a radio communication terminal different from said radio communication terminal, serving as said communication partner.

By this arrangement, in case the ability relating to the reduction of overhead of the communication partner is acquired, inquiries can be made to a management terminal in charge of concentrative management about the ability relating to the reduction of overhead from the radio communication terminal other than the communication partner or to the radio communication terminal, which has knowledge of the ability of the radio communication terminal of the communication partner, and this alleviates the burden of processing at each of the radio communication terminals. For instance, when radio communication is performed between a multiple of terminals, communication management can be easily made by requesting the ability to reduce overhead of the radio communication terminal and by registering own ability at the management terminal, and this makes it possible to attain radio communication with higher efficiency.

Also, the present invention provides the radio communication method as described above, wherein said radio communication terminals perform said radio communication according to communication setting to reduce said header transmission time and/or said idle time.

By this arrangement, it is possible to start the radio communication by utilizing the method to reduce optimal overhead for mutual radio communication after performing the communication setting to reduce the overhead among the radio communication terminals.

Further, the present invention provides the radio communication method as described above, wherein a radio communication method in a radio LAN system for radio communication based on TDMA system with idle time provided between data to be transmitted and received by radio communication terminals on a radio section, wherein said radio communication terminals carrying out radio communication reduce transmission time of the header added to said data and/or said idle time to perform communication.

By this arrangement, it is possible to start radio communication by utilizing the method to reduce optimal overhead for mutual radio communication after performing the communication setting to reduce the overhead among the radio communication terminals.

Also, the present invention provides the radio communication method as described above, wherein said radio communication terminals change communication setting to reduce said header transmission time and/or said idle time.

By this arrangement, it is possible to execute a method to reduce overhead, to change the degree of data transmission efficiency by the reduction of overhead, to shift to the communication by utilizing the reduction of overhead from normal radio communication and to shift to normal radio communication from the communication utilizing the reduction of overhead.

Further, the present invention provides the radio communication method as described above, wherein said radio communication terminal acquires ability to reduce said header transmission time and/or said idle time of said radio communication terminal, serving as said communication partner, from a radio communication terminal different from said radio communication terminal, serving as said communication partner, and by referring to said ability, said radio communication terminal changes communication setting to reduce said header transmission time and/or said idle time.

By this arrangement, when the communication setting relating to the overhead is to be changed during radio communication, the ability to perform reduction of the overhead of radio communication terminal is acquired from a management terminal in charge of concentrative management of the ability to reduce the overhead from radio communication terminal other than the communication partner or from radio communication terminal, which has already the knowledge of the ability of radio communication terminal of the communication partner, and the communication setting can be changed.

Also, the present invention provides the radio communication method as described above, wherein header is added to each of the predetermined data transmissions and the other data is transmitted without adding the header.

By this arrangement, it is possible to reduce the number of transmissions of the data, to which the header is added, and to reduce the transmission time of the header.

Further, the present invention provides the radio communication method as described above, wherein number of said data transmissions where said header is added is set in said communication setting.

By this arrangement, it is possible to set the frequency to add the header to match the ability of the radio communication terminal or the condition of radio section before shifting the communication mode to reduce the overhead or in the middle of the communication mode to reduce the overhead.

Also, the present invention provides the radio communication method as described above, wherein said radio communication terminal acquires said header added to said data existent on said radio section in advance, and if said data without said header added to it is received, transmission time of said header is reduced by referring to said header acquired in advance.

By this arrangement, it is possible to reduce the number of transmissions of the data, to which the header is added, and to reduce the transmission time of the header.

Further, the present invention provides the radio communication method as described above, wherein said radio communication terminal transmits said information relating to header to said radio section as said data and adds a predetermined identification information associated with, said header to the data to be transmitted subsequently.

By this arrangement, it is possible to acquire the information relating to the header of the radio communication terminal of the communication partner at the same time and to reliably identify the radio communication terminal by the identification information. Also, it is possible to reduce the transmission time of the header by using the identification information, which is lower in capacity than the header.

Also, the present invention provides the radio communication method as described above, wherein, in case said radio communication terminal receives an information relating to the header of a radio communication terminal, serving as said communication partner, identification information to identify the radio communication terminal, serving as transmission source of said information relating to said header, is associated with the information relating to said header received, and said identification information is transmitted to said radio communication terminal, serving as the transmission source.

By this arrangement, it is possible to acquire the information relating to the radio communication terminal of the communication partner at the same time and to reliably identify the radio communication terminal by the identification information. Also, it is possible to reduce the transmission time of the header by using identification information, which is lower in capacity than the header.

Further, the present invention provides the radio communication method as described above, wherein said identification information is set in said communication setting.

By this arrangement, it is possible to set identification information before shifting to communication mode to reduce the overhead and to shift to the method to reduce overhead using identification information in the middle of the communication mode to reduce overhead.

Also, the present invention provides the radio communication method as described above, wherein said radio communication terminal receives said data and transmits the data after said receiving acknowledgment information when the receiving acknowledgment information to notify that said data has been received is transmitted.

By this arrangement, it is possible to reduce useless idle time (IFS) provided immediately after the receiving acknowledgment information in case the data is to be transmitted immediately after the receiving of the data.

Further, the present invention provides the radio communication method as described above, wherein said radio communication terminal terminates transmission of said data following said receiving acknowledgment information in accordance with a predetermined condition.

By this arrangement, it is possible to eliminate deviation in the occupying ratio of the radio section of the radio communication terminal by voluntarily terminating data transmission of the radio communication terminal performing the data transmission or by forcibly terminating data transmission by a predetermined management terminal after the receiving acknowledgment information in accordance with the requirements on time or data capacity.

Also, the present invention provides the radio communication method as described above, wherein communication in accordance with IEEE Std 802.11 is utilized as radio communication.

By this arrangement, it is possible to apply the present invention in a radio communication terminal and a radio LAN system operated in accordance with IEEE Std 802.11, which is the standards of radio LAN.

BEST MODE FOR CARRYING OUT THE INVENTION

Figure 1:
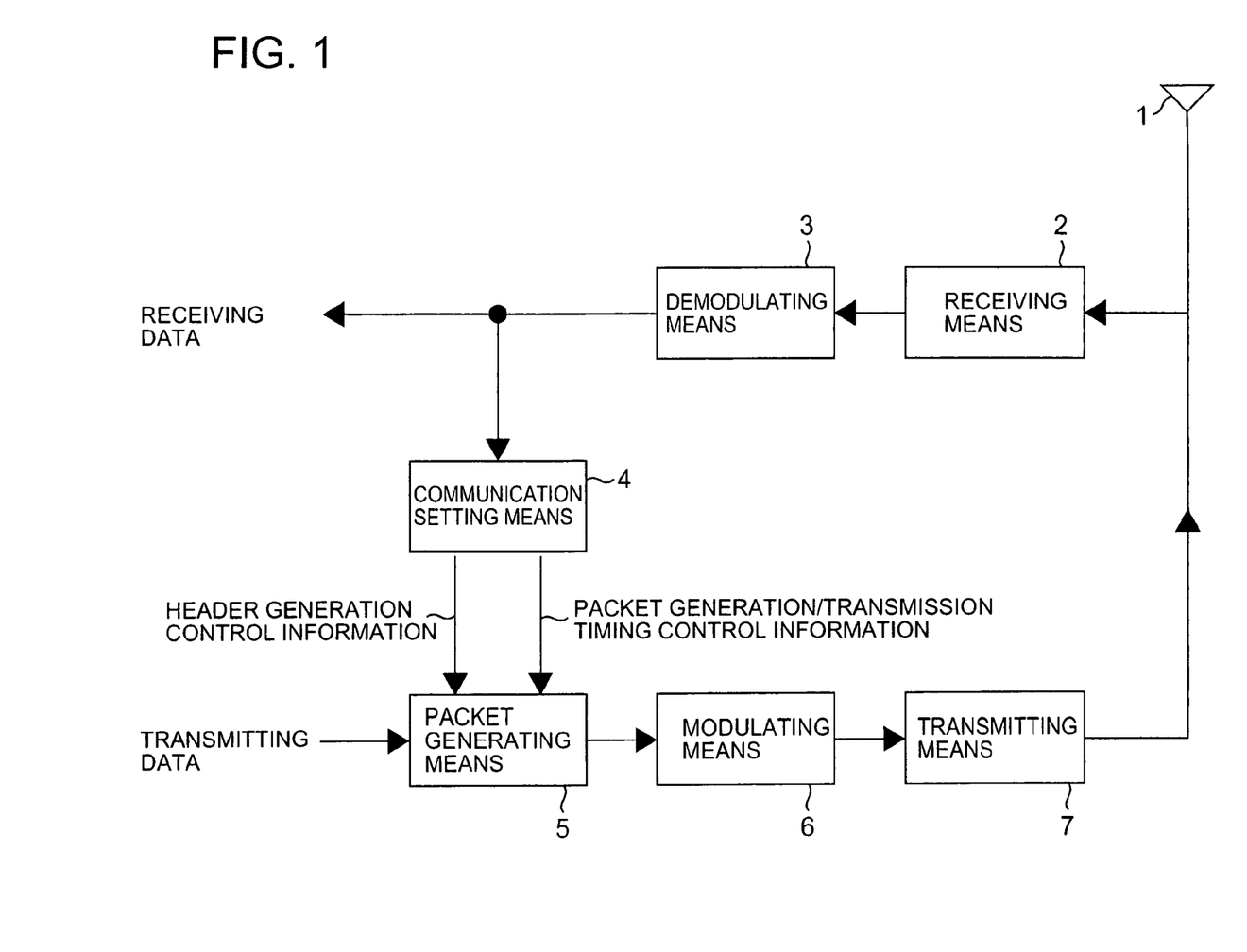
FIG. 1 is a block diagram to show an embodiment of internal arrangement of a radio communication terminal according to the present invention.

Description will be given below on the preferred aspects of the present invention referring to the drawings. FIG. 1 is a block diagram to show an embodiment of internal arrangement of a radio communication terminal according to the present invention. A radio communication terminal (may be called hereinafter simply as "terminal") shown in FIG. 1 comprises an antenna 1, receiving means 2, demodulating means 3, communication setting means 4, packet generating means 5, modulating means 6, and transmitting means 7.

The radio communication terminal receives a signal transmitted via a radio section by means of the antenna 1 and the receiving means 2. The receiving means 2 performs signal processing as required such as A/D conversion to the receiving signal. Further, the signal after processing is supplied to the demodulating means 3, and demodulation processing is carried out. After the demodulation processing by the demodulating means 3, the data is sent to predetermined processing means (not shown) in the radio communication terminal as receiving data, and the receiving data is always monitored by the communication setting means 4.

The communication setting means 4 monitors whether or not information related to reduction of overhead (or suspension of reduction of overhead) is contained in the receiving data or in a header added to it. In case there is information relating to the reduction of overhead, it is judged whether the reduction of overhead should be performed or not according to the information. In case the reduction of overhead should be carried out, a header generation control information to instruct the header generation control (presence or absence of header, and control on the designation of the information to be used as header) is issued, or packet generation/transmission time control information to instruct the control of packet generating time and packet output timing (control of IFS) is issued when the transmission data is converted to a packet to be transmitted to the communication partner. The method to reduce overhead in the communication setting means 4 will be explained later in detail.

The header generation control information and the packet generation/transmission timing control information to be outputted from the communication setting means 4 are sent to the packet generating means 5. The packet generating means 5 generates and outputs a packet from the transmission data supplied from predetermined data supplying means (not shown) in the radio communication terminal according to the header generation control information or the packet generation/transmission timing control information. The packet outputted from the packet generating means 5 is sent to the modulating means 6, and modulation processing is performed. Further, after modulation processing, the signal is sent to the transmitting means 7. After the signal processing as required, it is transmitted to radio section via the antenna 1.

Figure 2A:
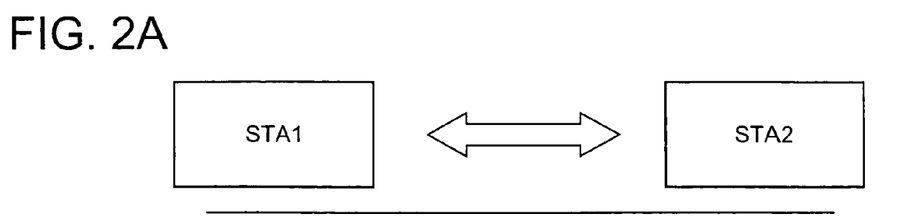
FIG. 2A is a block diagram showing an aspect of communication of a radio LAN system between two terminals in the present invention.
Figure 2B:
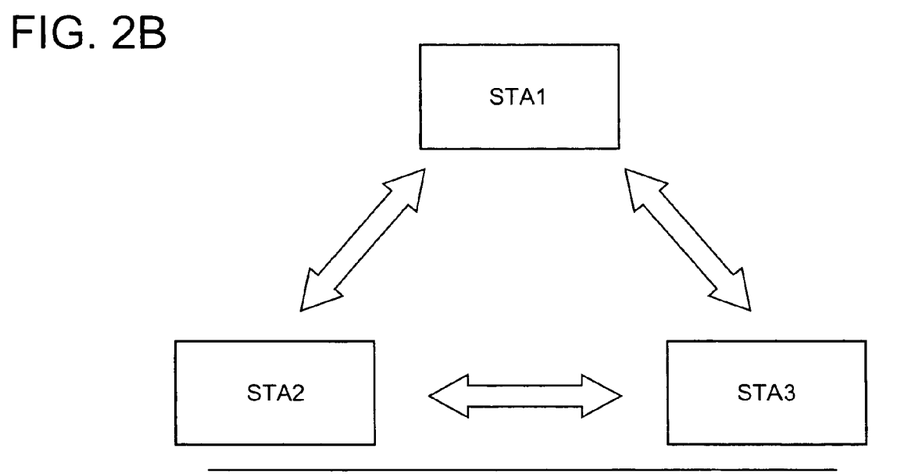
FIG. 2B is a block diagram showing an aspect of communication of a radio LAN system among three terminals in the present invention.
Figure 2C:
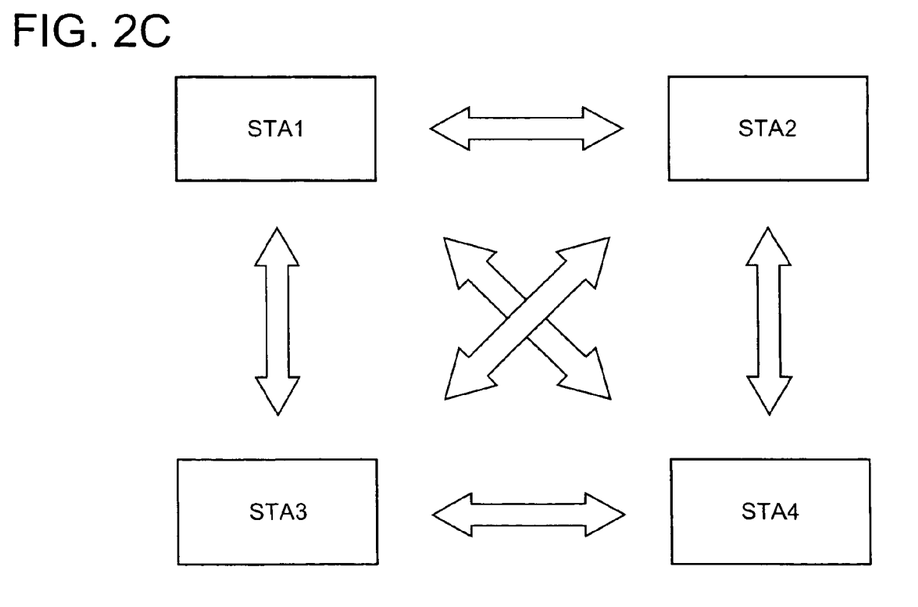
FIG. 2C is a block diagram showing an aspect of communication of a radio LAN system among four terminals in the present invention.

FIG. 2 is a block diagram to show an embodiment of a radio LAN system according to the present invention. FIG. 2A shows an aspect of communication between two terminals, FIG. 2B shows an aspect of communication among three terminals, and FIG. 2C shows an aspect of communication among four terminals. As shown in each of FIG. 2A, FIG. 2B and FIG. 2C, each of a plurality of terminals (these are shown as STA1, STA2, STA3, and STA4 in FIG. 2) can carry out radio communication with other terminal on equal basis. Although not shown in the figure, each of the terminals can also carry out direct radio communication with other terminal in case the LAN system comprises 5 or more terminals. Also, access point may be installed for the purpose of performing relay when it is not possible to perform direct radio communication between the terminals, to manage common information, to control the entire radio LAN system, or to make connection with external network.

Figure 3:
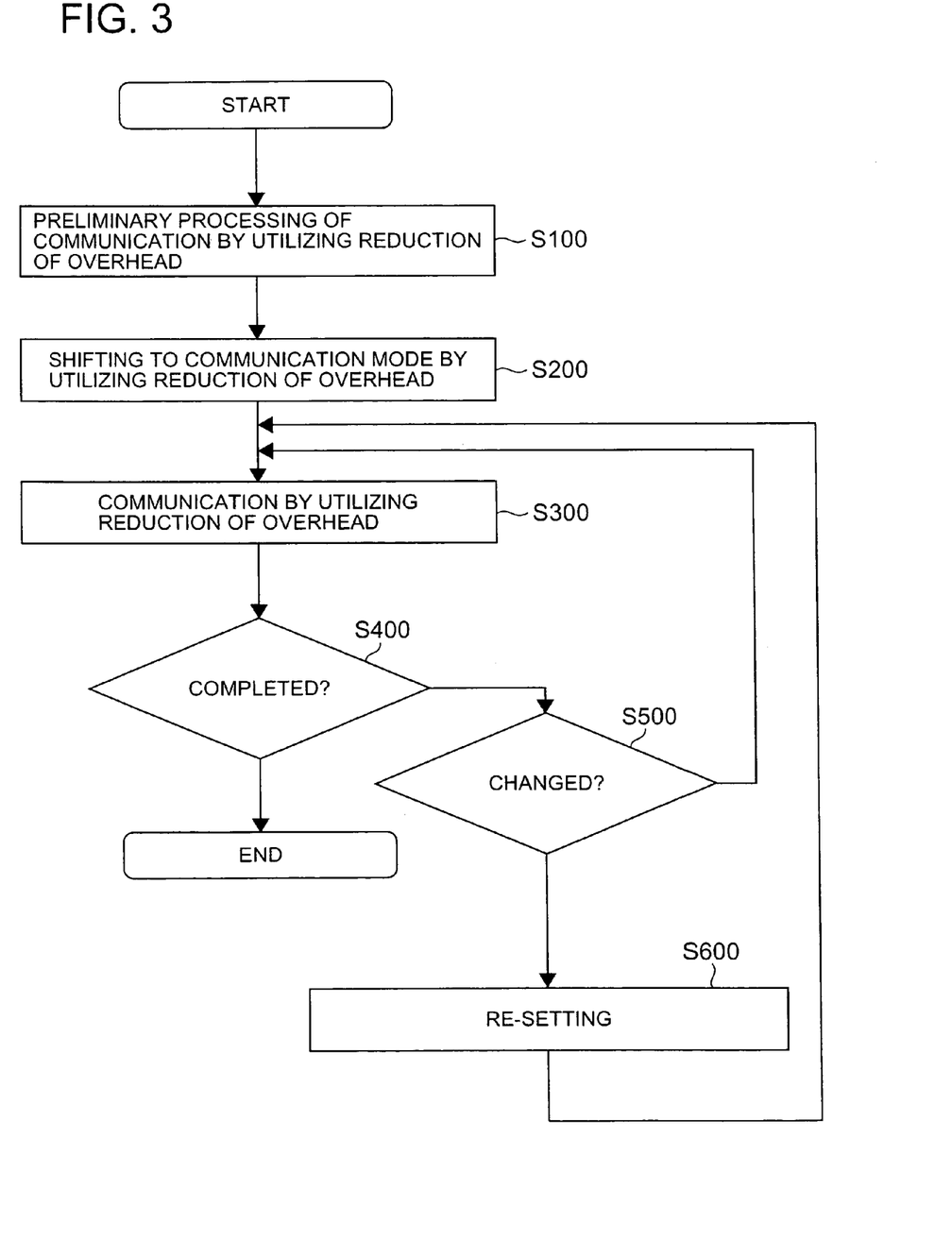
FIG. 3 is a flow chart explain general outline of operation according to the present invention.

Next, description will be given on general outline of the operation according to the present invention. FIG. 3 is a flow chart to explain general outline of the operation according to the present invention. When a terminal belonging to the radio LAN system performs communication by applying the present invention, it is necessary to make arrangement on the reduction of overhead between the terminals in preliminary stage of the communication. That is, when communication is performed by the terminals, it is confirmed whether it is possible or not to reduce the overhead (whether there is ability to reduce the overhead or not). If it is possible to reduce the overhead, a method to reduce the overhead is selected, and various parameters are set in the reduction of the overhead (Step S100: preliminary stage processing of communication by the reduction of overhead).

In case there is an arrangement on the overhead between the terminals in advance (e.g. in case the arrangement of the overhead is standardized in advance in the radio LAN system), there is no need to perform processing in the preliminary stage of the communication to reduce the overhead as described above.

When the preliminary stage of the communication by utilizing the reduction of overhead is completed, the terminals are shifted to communication mode, in which it is possible to perform communication by utilizing the reduction of overhead (Step S200: shifting to communication mode by utilizing the reduction of overhead). Then, the method to reduce the overhead as arranged in the preliminary stage of communication is carried out and the communication according to various types of parameters is performed (Step S300: communication by utilizing the reduction of overhead).

The communication mode by utilizing the reduction of overhead can be voluntarily terminated by a terminal, which performs the communication, and it is also possible to forcibly terminate the communication mode by the other terminal (Step S400: termination). It is further possible to change the method to reduce overhead as arranged in the preliminary stage of communication or to change various types of parameters (Step S500: change). Further, the terminals performing communication may select again the method to reduce overhead or may change various types of parameters and may re-set the communication by utilizing the reduction of overhead (Step S600: re-setting).

Next, referring to the general outline of operation as shown in the above flow chart, detailed description will be given on the operation in each step. In Step S100, preliminary stage of communication utilizing the reduction of overhead is performed, and the communication by utilizing the reduction of overhead is set. In particular, this setting is preferably carried out by taking communication function (communication ability) at each terminal into account. For instance, it is possible to utilize the following conditions at each of the terminals:

Whether it is possible or not to perform communication by utilizing the reduction of overhead.

Method to reduce the utilizable overhead.

Whether it may be possible or not to perform communication of control information (control frame) at high-speed transmission rate.

It is also possible to utilize the conditions other than those described above. Further, it is possible to set a method to reduce the utilizable overhead (to be described later) or to set various types of parameters corresponding to communication function of the terminals (hereinafter referred as "overhead reduction parameters").

In order that each terminal refers to the above condition relating to the terminal of the communication partner and to perform the setting of overhead reduction parameters, it is necessary to know and identify communication function of the terminal of the communication partner. To know and identify the communication function of the terminal of the communication partner, it may be designed in such manner that the terminals acquire or exchange the above conditions directly between themselves or to perform mutual setting of overhead reduction parameters. In particular, in a radio LAN system comprising a multiple of terminals, information of each terminals relating to the reduction of overhead may be concentrated to a single terminal (management terminal). By acquiring the communication function of the terminal of the communication partner from the management terminal, it is possible to know the communication function of the terminal of the communication partner with higher efficiency.

Now, description will be given on a case where the information of each of the terminals relating to the reduction of overhead is concentrated to a single terminal by referring to FIG. 2B. Here, for instance, as shown in FIG. 2B, description will be given on a case where STA2 tries to acquire information relating to the reduction of overhead of STA3 in an arrangement where there are three terminals (STA1, STA2, and STA3) in a radio LAN system.

When STA2 tries to acquire information relating to the reduction of overhead of STA3, request is made to STA1, for instance, to acquire information relating to the reduction of overhead of STA3. In case STA1 is a management terminal in charge of concentrative management of information relating to the reduction of overhead of each of the terminals or in case communication has been already made with STA3 in advance and the information relating to the reduction of overhead of STA3 has been already acquired, STA1 holds the information relating to the reduction of overhead of STA3. When the information relating to the reduction of overhead of STA3 is transmitted from STA1 to STA2, STA2 can acquire the information relating to the reduction of overhead of STA3.

As described above, when a terminal (STA1) different from the terminal (STA3) of the communication partner has the information relating to communication ability to reduce overhead of the terminal (STA3) of the communication partner, the terminal (STA2) can acquire communication ability relating to the reduction of overhead of the terminal (STA3) of the communication partner from the terminal (STA1), which is different from the terminal (STA3) of the communication partner. In case STA2 has no knowledge of the address of the terminal to be communicated (STA3), it is also possible to acquire by requesting the information relating to the reduction of overhead at the same time when it is tried to acquire the address through inquiry by utilizing the technique of WARP (Wireless Address Resolution Protocol) to inquire another terminal (STA1) about the address of STA3.

Next, when the preliminary stage processing of the communication by utilizing the reduction of overhead has been completed, it is shifted at the same time to a communication mode by utilizing the reduction of overhead according to the control by the terminals or by a predetermined management terminal in Step S200. In this case, as the communication system between the terminals, the communication system (HCF: Hybrid Coordination Function) under the standardization by IEEE Std 802.11e may be used.

Figure 4:
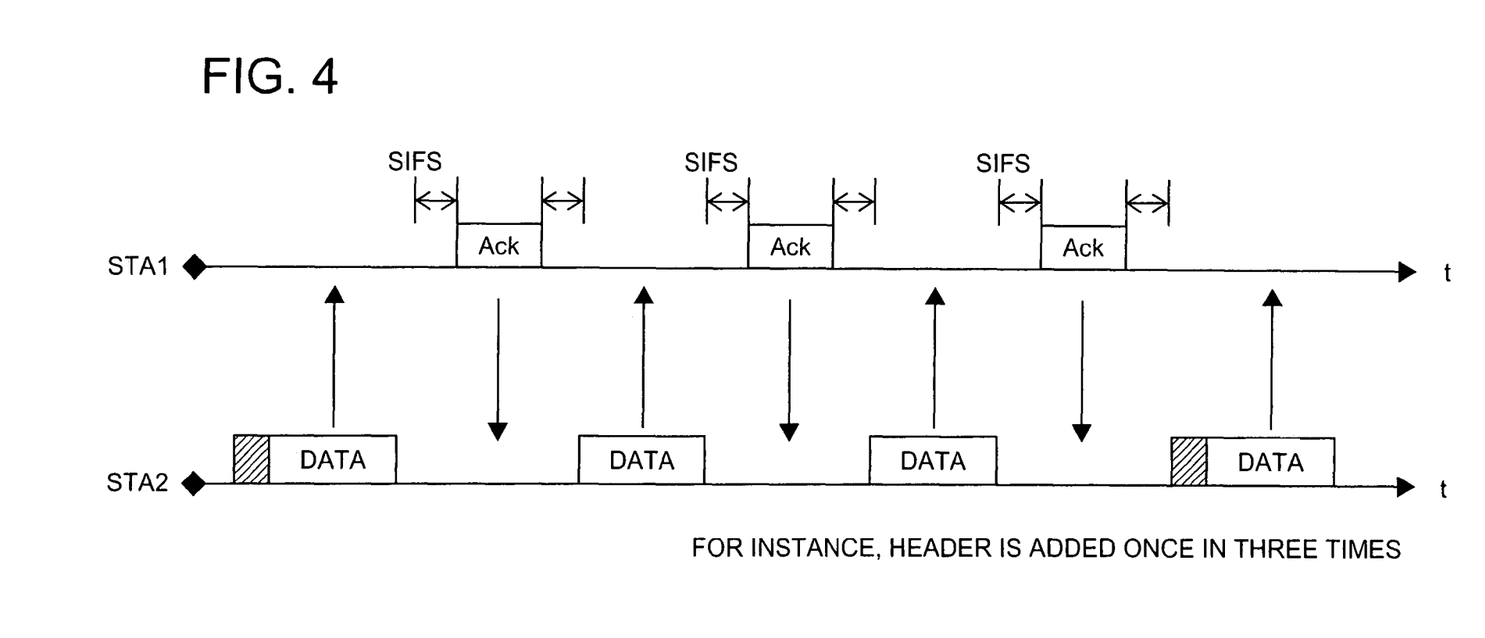
FIG. 4 is a drawing to explain exchange of data between terminals in the present invention, and it schematically shows a method to add a header for each predetermined data transmission.

Next, description will be given on the communication by utilizing the reduction of overhead in Step S300. As the method to reduce the overhead, the following methods may be adopted:

A method to add header for each transmission of data (See FIG. 4).

Figure 5:
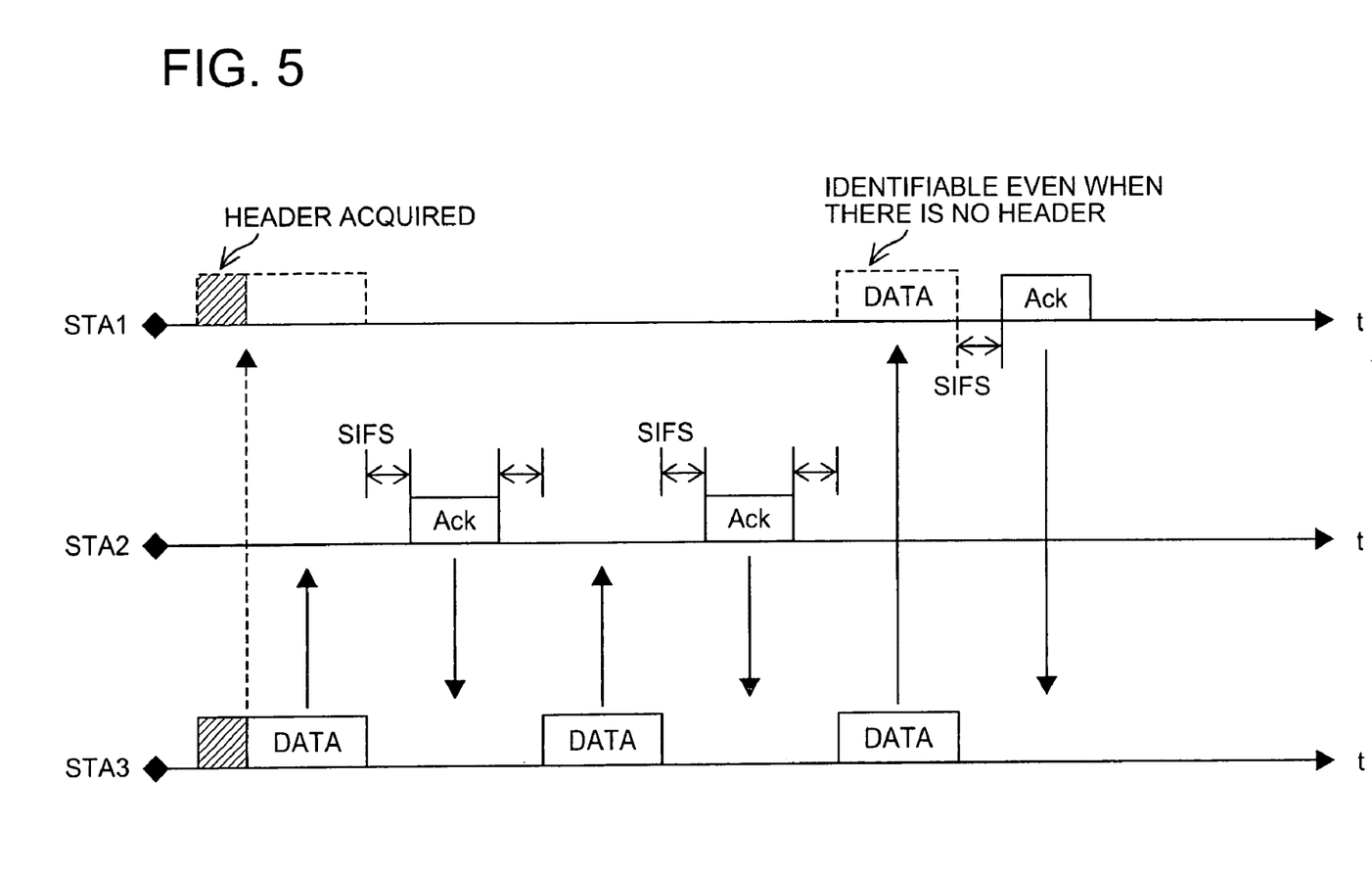
FIG. 5 is a drawing to explain exchange of data between terminals in the present invention, and it schematically shows a method to acquire header of data on radio section in advance.

A method to acquire the header of the data on the radio section in advance (See FIG. 5).

Figure 6:
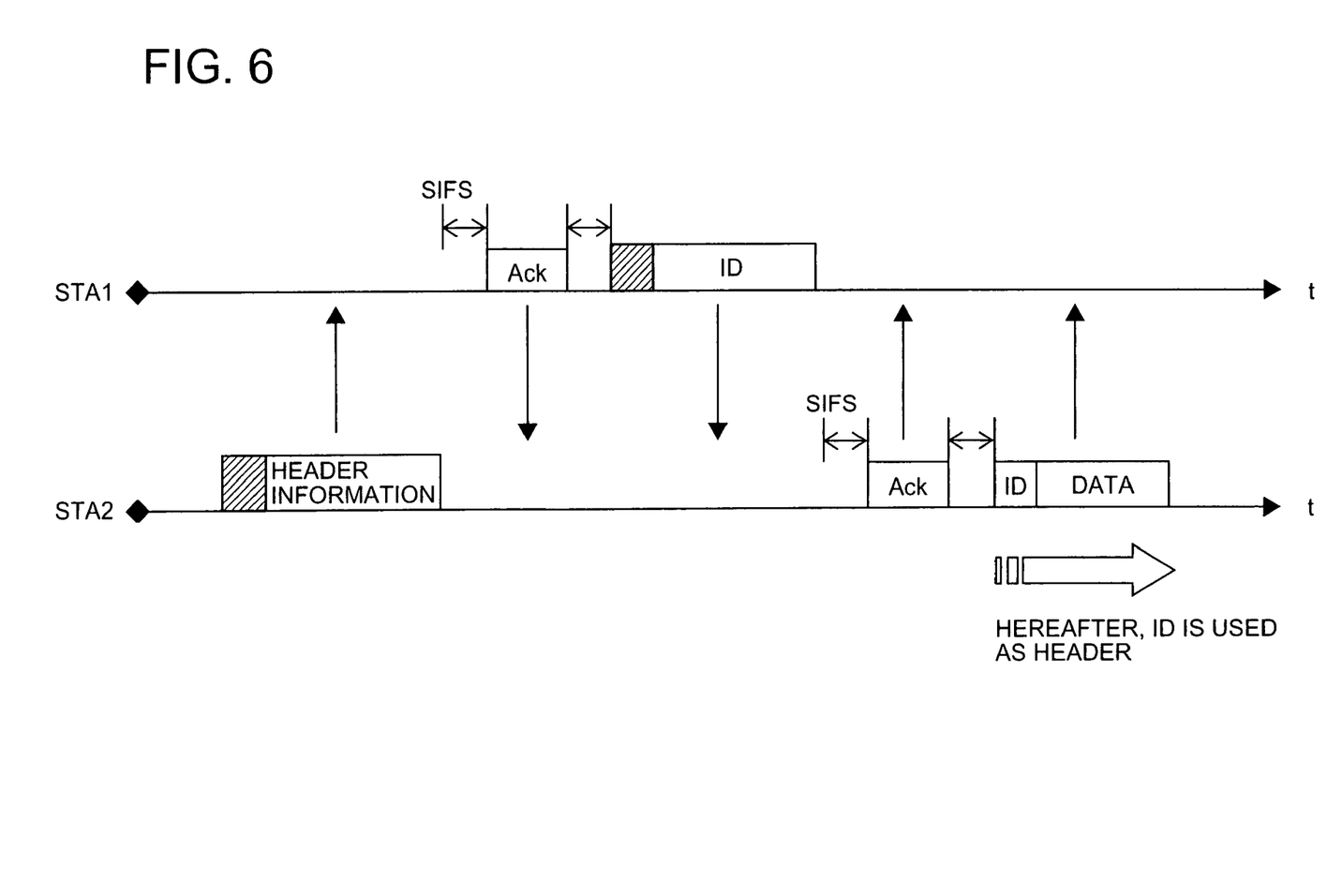
FIG. 6 is a drawing to explain exchange of data between terminals in the present invention, and it schematically shows a method to use identification information as header.

A method to utilize identification information as header (See FIG. 6).

Figure 7:
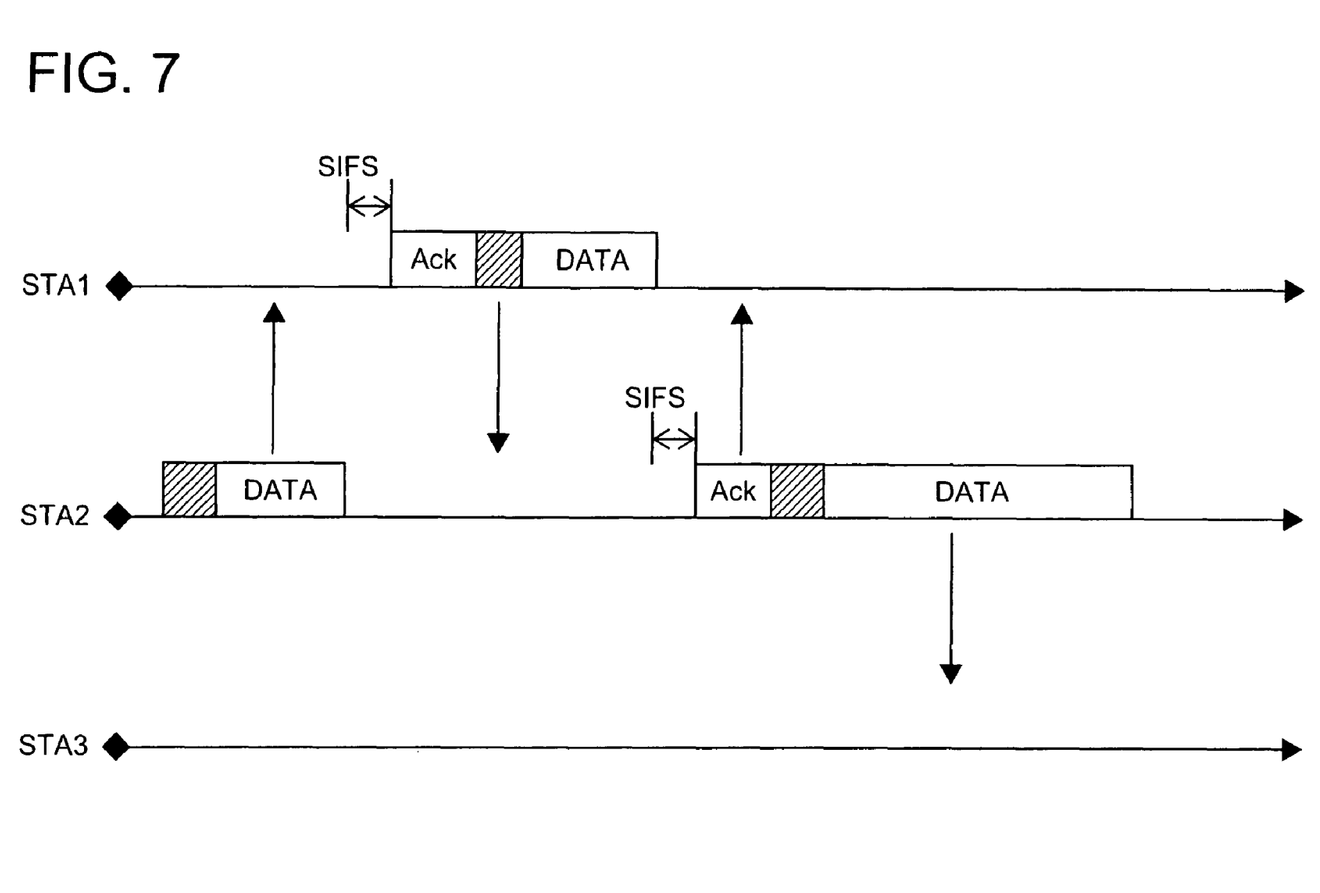
FIG. 7 is a drawing to explain exchange of data between terminals in the present invention, and it schematically shows a method to reduce IFS immediately after Ack.

A method to reduce IFS immediately after Ack (See FIG. 7).

Now, description will be given on the method to reduce overhead as used in Step S300 and on the operation in Step 400 and thereafter in case the method to reduce overhead is used.

First, description will be given on the method to add the header for each data transmission required as the method to reduce the overhead. FIG. 4 is a drawing to explain the exchange of the data between the terminals according to the present invention, and it is a schematical drawing to explain the method to add header for each data transmission as required. In FIG. 4, the exchange of the data between two terminals (STA1 and STA2 in FIG. 4) is shown.

In case the data is transmitted from STA2 to STA1 by using the method to add the header for each data transmission, STA2 first transmits the data with header to STA1. After Ack (receiving acknowledgment information) has been received from STA1, the data without header is continuously transmitted to STA1. By regarding the data without header as the data, which is continuous after the data with header as received at first, it is possible to perform the processing relating to the processing of the data without header. In case radio communication is performed in a communication mode where Ack can be omitted, it is possible to carry out the method to reduce overhead as described above in such a communication mode by continuously transmitting the data without header instead of receiving Ack at STA2.

Also, it is possible to transmit the data with header for each data transmission as required (or at a predetermined time). As a result, normal transmission of the data with header can be carried out for each data transmission as required, and this makes it possible maintain the certainty of data transmission. In FIG. 4, the number of the predetermined data transmissions is set to 3, and an aspect is shown where the data with header is transmitted at a rate of one in three. However, the number of the predetermined data transmissions can be set as desired. For instance, when the number of the predetermined data transmissions is set to ∞, the data with header is transmitted at first, and all data transmitted thereafter are turned to the data without header.

Also, it is possible that the terminals performing communication with each other can set the number of the predetermined data transmissions in the preliminary stage processing of the communication in Step S100. This makes it possible to select the optimal number of the predetermined data transmissions to match the communication ability of the terminal, and this contributes to the improvement of data transmission efficiency.

For instance, in case the reduction of the overhead is to be terminated for the purpose such as power-saving, the method to add the header for each predetermined number of data transmissions is terminated in Step S400, and it is turned back to normal communication mode or the communication itself is discontinued.

Also, in case it is judged that the number of transmissions of the header should be increased (or decreased) in the middle of the communication or the information relating to the header is to be updated, it is judged in Step S500 that the change of the setting is needed. Then, the predetermined number of data transmissions to be added with header newly is set again in Step S600, or data transmission is carried out with the updated header added to it.

As described above, by adding header for each of the predetermined data transmissions and by transmitting data without adding header for the other data, it is possible to eliminate the header itself, which is to be added to the data. This makes it possible to decrease the number of transmissions of the data with header added to it and to reduce transmission time of the header in the overhead. As a result, data transmission efficiency can be improved.

Next, description will be given on a method to acquire the header of the data on radio section in advance as a method to reduce overhead. FIG. 5 explains the exchange of the data between terminals according to the present invention, and it schematically shows a method to acquire the header of the data on radio section in advance. FIG. 5 shows the exchange of the data among three terminals (STA1, STA2 and STA3 in FIG. 5).

When STA3 transmits a data with header to STA2, the data with header flows on the radio section. Therefore, the terminal other than STA2 (e.g. STA1), which is the destination of this data with header, can receive this data with header, and STA1 can acquire the header of STA3 from this data with header.

When STA3 transmits the data to STA1, STA3 transmits the data to STA1 without adding the header. By using the header of STA3 acquired in advance as the header to be added to this data without header, STA1 can carry out the processing relating to the processing of the data without the header added to it. To perform the above operation, it is preferable that STA3 knows that STA1 has already acquired the header of STA3. It is also preferable to notify STA1 in advance that the same header as the header transmitted to STA2 can be used as the data addressed to STA1.

For instance, in case the reduction of overhead is to be terminated for the purpose such as power saving, the header of the data on radio section is acquired in advance in Step S400 and the method to use the header is terminated. Then, it is turned back to normal communication mode or the communication itself is discontinued. Also, in case the information relating to the header is updated in the middle of the communication, for instance, it is judged in Step S500 that the change of the setting is needed. Then, the updated header is added in Step S600, and data is transmitted.

As described above, by acquiring the data on radio section (data addressed to the other terminal) in advance, when communication is performed with a terminal, which is the source of transmission of the header, it is possible to receive the data without header added to it and to use a header, which has been added to the data addressed to the other terminal in advance. It is possible to eliminate the header itself to be added to the data and to reduce the transmission time of the header at the overhead, and this contributes to the improvement of data transmission efficiency.

Next, description will be given on a method to utilize identification information as header as a method to reduce the overhead. FIG. 6 explains the exchange of the data between terminals according to the present invention, and it schematically shows a method to utilize identification information as header. FIG. 6 shows the exchange of the data between two terminals (STA1 and STA2 are shown in FIG. 6).

STA2 transmits information relating to header (header information) to STA1 in advance. The information relating to the header to be transmitted to STA1 can be transmitted as data, and not as a header. Therefore, all types of information (redundant information) to be included in the header of STA2 can be transmitted.

On the other hand, upon receipt of the information relating to the header, STA1 caches the information relating to the header. Further, the information relating to the cached header is associated with the identification information (the information shown as ID in FIG. 6). As the identification information, it is possible to allocate arbitrary information. Also, it is possible to utilize predetermined identification information to identify STA2. Then, STA1 notifies STA2 that the information relating to the header of STA2 has been cached, and it also notifies the allocated identification information. It is also possible to carry out the processing up to this moment in the preliminary stage processing of the communication in Step S100.

By the above operation, the information relating to the header of STA2 is cached in STA1, and identification information to identify STA2 (i.e. identification information to identify the information relating to the cached header of STA2) is set. In case STA2 transmits the data to STA1, identification information is added to the data instead of the header, and data transmission is carried out. It is preferable that the capacity of the identification information is lower than the capacity of the header normally used.

In the above, description has been given on an aspect where the information relating to the header is transmitted from STA2 to STA1, and STA1 caches the information relating to the header thus received. It may also be designed in such manner that STA1 caches the header added to the data received by normal method (header+data) and allocates the identification information to the header.

Also, in case the reduction of overhead is to be terminated for the purpose such as power saving, the method to utilize identification information as header is terminated in Step S400, and it is turned back to normal communication mode or the communication itself is discontinued. Also, in case the information relating to the header is updated, for instance, in the middle of the communication, it is judged in Step S500 that the change of the setting (updating of the information relating to the header cached at the terminal of the communication partner) is needed. Then, in Step S600, the information relating to the new header is transmitted (re-setting).

In case STA2 changes the information relating to header, data transmission is performed by adding "identification information+difference of header" (difference between the header before the change and the header after the change). Then, upon receipt of this information, STA1 refers to the sum of "the information relating to the cached header of STA2+the difference". As a result, by simply transmitting the difference of the header from STA2 to STA1, it is possible to update the header. The method to transmit the difference of header is particularly effective in the communication where the header is changing every moment.

As described above, the information relating to the header is cached in the terminal of the communication partner in advance and the identification information associated with the information of the cached header is used instead of the header. As a result, it is possible to change the header added to the data to mere identification information. Thus, the capacity of the overhead is reduced and the transmission time of the header in the overhead is decreased. This contributes to the improvement of data transmission efficiency.

Next, as a method to reduce the overhead, description will be given on a method to reduce IFS immediately after Ack. FIG. 7 explains the exchange of the data between the terminals according to the present invention, and it schematically shows a method to reduce IFS immediately after Ack. FIG. 7 shows the exchange of the data among three terminals (STA1, STA2, and STA3 in FIG. 7).

For instance, in case STA1 receives data from STA2, STA1 transmits Ack (receiving acknowledgment information) to STA2 to show that the data has been successfully received. In this case, IFS is set in normal communication in such manner that radio section is turned to non-signal condition for a certain period of time after the completion of the transmission of Ack. According to the present invention, in case the terminal tries to transmit the data after Ack when Ack has been received, the data is transmitted without idle time immediately after Ack. The terminal of the destination of Ack may be the same as the terminal of the destination of the data immediately after it or may be different from it.

Figure 8:
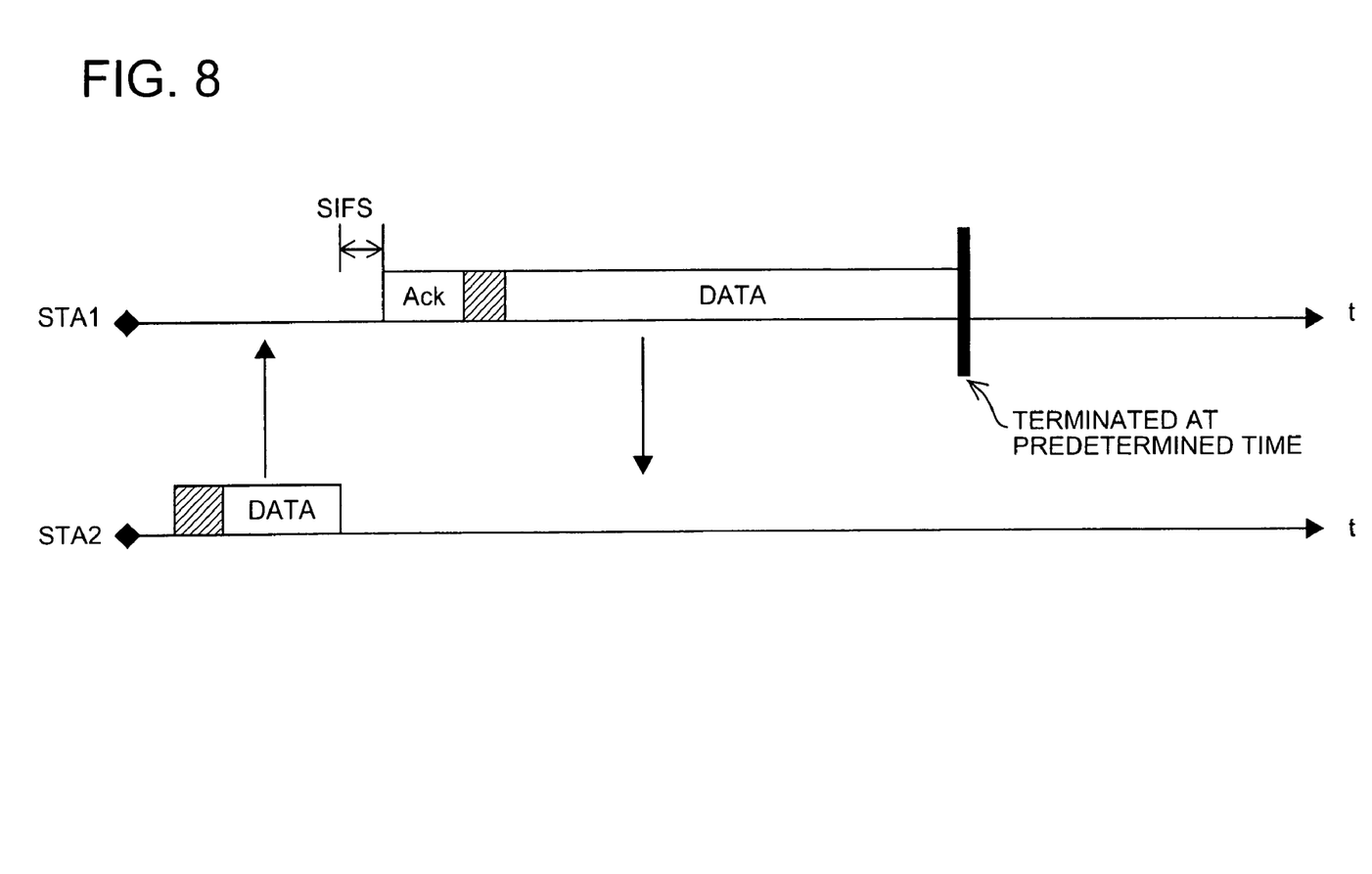
FIG. 8 is a schematical drawing to explain operation to terminate the transmission of the data in the method to reduce IFS immediately after Ack in the present invention.

FIG. 8 is a schematical drawing to explain the operation after the termination of data transmission in the method to reduce IFS immediately after Ack according to the present invention. In case the terminal transmitting Ack can continuously transmit the data immediately after Ack as shown in FIG. 7, a terminal having this function may preferentially occupy the radio section. Therefore, the longest transmission time of the data transmissible immediately after Ack or the maximum capacity of the data should be set to a predetermined value so that each terminal can use the radio section without causing deviation, and it is so designed that data transmission is terminated if this value is exceeded. It is also possible to monitor whether the terminal performing the communication has exceeded the longest transmission time of the data or the maximum capacity of the data, and the terminal of source of transmission or the terminal of the destination can voluntarily terminate transmitting or receiving of the data. It is also possible that transmitting and receiving of the data are forcibly terminated by a management terminal, which monitors the radio section. It is further possible to set the longest transmission time of the data relating to the transmission time of continuous data and to set the maximum capacity of the data in the preliminary stage processing of the communication in Step S100.

Also, in case the reduction of overhead is to be terminated for the purpose such as power saving, the method to reduce IFS immediately after Ack is terminated and it is turned back to normal communication mode or the communication itself is discontinued. In case it is judged in Step S500 that the change such as the setting of the longest transmission time of the data relating to continuous data or the maximum capacity of the data is needed, for instance, in the middle of communication, the setting is changed (re-setting) in Step S600, and the communication is carried out again.

As described above, the terminal carrying out the data transmission may voluntarily terminate the data transmission due to the requirements such as time or data capacity after the receiving acknowledgment information, or the data transmission may be forcibly terminated by a predetermined management terminal so that no deviation occurs in the share or the occupying ratio of the radio section of the terminals.

As described above, IFS is reduced immediately after Ack and the terminal transmitting Ack continuously transmits the data without setting IFS immediately after Ack. As a result, it is possible to reduce useless idle time immediately after Ack. Also, due to the requirements such as time or data capacity, data transmission immediately after Ack is voluntarily or forcibly terminated. As a result, the deviation in the share or the occupying ratio of the radio section of each terminal can be eliminated.

The method to reduce the overhead according to the present invention is not limited to such methods as described above, i.e. a method to add header for each of the predetermined data transmissions, a method to acquire the data on the radio section in advance, a method to utilize identification information as header, or a method to reduce IFS immediately after Ack. The other methods to reduce overhead may be adopted (such as compression of header or omission or shortening of IFS, etc.). Also, a plurality of methods to reduce the overhead may be used, and this makes it possible to carry out the communication with higher efficiency.

INDUSTRIAL APPLICABILITY

As described above, according to the present invention, idle time is provided between the data to be transmitted and received by radio communication terminals on radio section. When radio communication (in particular, radio communication in accordance with IEEE Std 802.11) is performed, radio communication terminals can carry out radio communication by reducing transmission time of the header added to the data and/or by reducing idle time. Thus, it is possible to reduce the overhead (header transmission time add/or idle time), and this contributes to the improvement of data transmission efficiency.

What is claimed is:

1. A reception device of a first radio communication terminal in a wireless LAN system for radio communication based on a TDMA system with idle time provided between data to be transmitted and received by radio communication terminals, said reception device comprising:
    monitoring unit that monitors data which is transmitted from a second radio communication terminal in said wireless WLAN system to a third radio communication terminal in said wireless WLAN system;
    header acquiring unit that acquires a header of said monitored data, said header being able to be used for processing of data addressed to said first radio communication terminal; and
    a processing performing unit that, in case of receiving data without said header from said second radio communication terminal, performs processing of said received data referring to said header acquired from said monitored data.

2. The reception device according to claim 1, further comprising a setting changing unit that changes a communication setting during said radio communication to reduce header transmission time and/or idle time.

3. The reception device according to claim 1, further comprising:
    an ability acquiring unit that acquires an ability to reduce header transmission time and/or idle time of said second radio communication terminal from a radio communication terminal different from said second radio communication terminal; and
    a setting changing unit that changes a communication setting during said radio communication to reduce said header transmission time and/or said idle time, by referring to said ability.

4. The reception device according to claim 1, further comprising:
    a first data reception unit that receives data with said header for each of predetermined data transmissions; and
    a second data reception unit that receives other data without said header being added.

5. The reception device according to claim 4, further comprising a number setting unit that sets the number of said predetermined data transmissions where said header is added in communication setting.

6. The reception device according to claim 1, further comprising:
    an identification information associating unit that associates identification information to identify said second radio communication terminal with information relating to said header; and
    a transmission unit that transmits said identification information to said second radio communication terminal.

7. The reception device according to claim 1, further comprising:
    a first reception unit that receives information relating to said header as data; and
    a second reception unit that receives data added with predetermined identification information from said second radio communication terminal subsequently, said predetermined identification information being associated with said header.

8. The reception device according to claim 7, further comprising an identification information setting unit that sets said identification information with said second radio communication terminal.

9. The reception device according to claim 1, further comprising a transmission unit that, when receiving data, transmits acknowledgment information to notify that said received data has been successfully received followed by transmitting data.

10. The reception device according to claim 9, further comprising a transmission terminating unit that terminates transmission of said data following said acknowledgment information in accordance with a predetermined condition.

11. The reception device according to claim 1, wherein communication in accordance with IEEE Std 802.11 is utilized as said radio communication.

12. A transmission device of a first communication terminal in a wireless LAN system for radio communication based on a TDMA system with idle time provided between data to be transmitted and received by radio communication terminals, said transmission device comprising:
   a first transmission unit that transmits data with a header to a second communication terminal in said wireless LAN system, said data being able to be acquired by a third communication terminal in said wireless WLAN system and said header of said data being able to be used for processing of data addressed to said third communication terminal; and
   a second transmission unit that transmits data without said header to said third communication terminal and that comprises a processing performing unit which, in case of receiving said data without said header, performs the processing of said data referring to said acquired header.

13. The transmission device according to claim 12, further comprising a setting changing unit that changes a communication setting during said radio communication to reduce header transmission time and/or idle time.

14. The transmission device according to claim 12, further comprising:
   an ability acquiring unit that acquires an ability to reduce header transmission time and/or idle time of said third radio communication terminal from a radio communication terminal different from said third radio communication terminal; and
   a setting changing unit that changes a communication setting during said radio communication to reduce said header transmission time and/or said idle time, by referring to said ability.

15. The transmission device according to claim 12, further comprising:
   a third transmission unit that transmits said data with said header for each of predetermined data transmissions; and
   a fourth transmission unit that transmits other data without said header being added.

16. The transmission device according to claim 15, further comprising a number setting unit that sets the number of said predetermined data transmissions where said header is added in communication setting.

17. The transmission device according to claim 12, further comprising an identification information reception unit that receives identification information to identify said first radio communication terminal from said third radio communication terminal, said identification information being associated with information relating to said header by said third radio communication terminal.

18. The transmission device according to claim 12, further comprising:
   a third transmission unit that transmits information relating to said header as data; and
   a fourth transmission unit that transmits data added with predetermined identification information to said third radio communication terminal subsequently, said predetermined identification information being associated with said header.

19. The transmission device according to claim 18, further comprising an identification information setting unit that sets said identification information with said third radio communication terminal.

20. The transmission device according to claim 12, further comprising a third transmission unit that, when receiving data, transmits acknowledgment information to notify that said received data has been successfully received followed by transmitting data.

21. The transmission device according to claim 20, further comprising a transmission terminating unit that terminates transmission of said data following said acknowledgment information in accordance with a predetermined condition.

22. The transmission device according to claim 12, wherein communication in accordance with IEEE Std 802.11 is utilized as said radio communication.

23. A reception method performed by a first radio communication terminal in a wireless LAN system for radio communication based on a TDMA system with idle time provided between data to be transmitted and received by radio communication terminals, said reception method comprising the steps of:
   monitoring data which is transmitted from a second radio communication terminal in said wireless WLAN system to a third radio communication terminal in said wireless WLAN system;
   acquiring a header of said monitored data, said header being able to be used for processing of data addressed to said first radio communication terminal; and
   in case of receiving data without said header from said second radio communication terminal, performing processing of said received data referring to said header acquired from said monitored data.

24. A transmission method performed by a first communication terminal in a wireless LAN system for radio communication based on a TDMA system with idle time provided between data to be transmitted and received by radio communication terminals, said transmission method comprising the steps of:
   transmitting data with a header to a second communication terminal in said wireless LAN system, said data being able to be acquired by a third communication terminal in said wireless WLAN system and said header of said data being able to used for processing of data addressed to said third communication terminal; and
   transmitting data without said header to said third communication terminal which comprises a processing performing unit that, in case of receiving said data without said header, performs the processing of said data referring to said acquired header.

* * * * *